July 30, 1946.　　　D. L. HARFORD　　　2,405,034
BATTERY
Filed Aug. 12, 1942
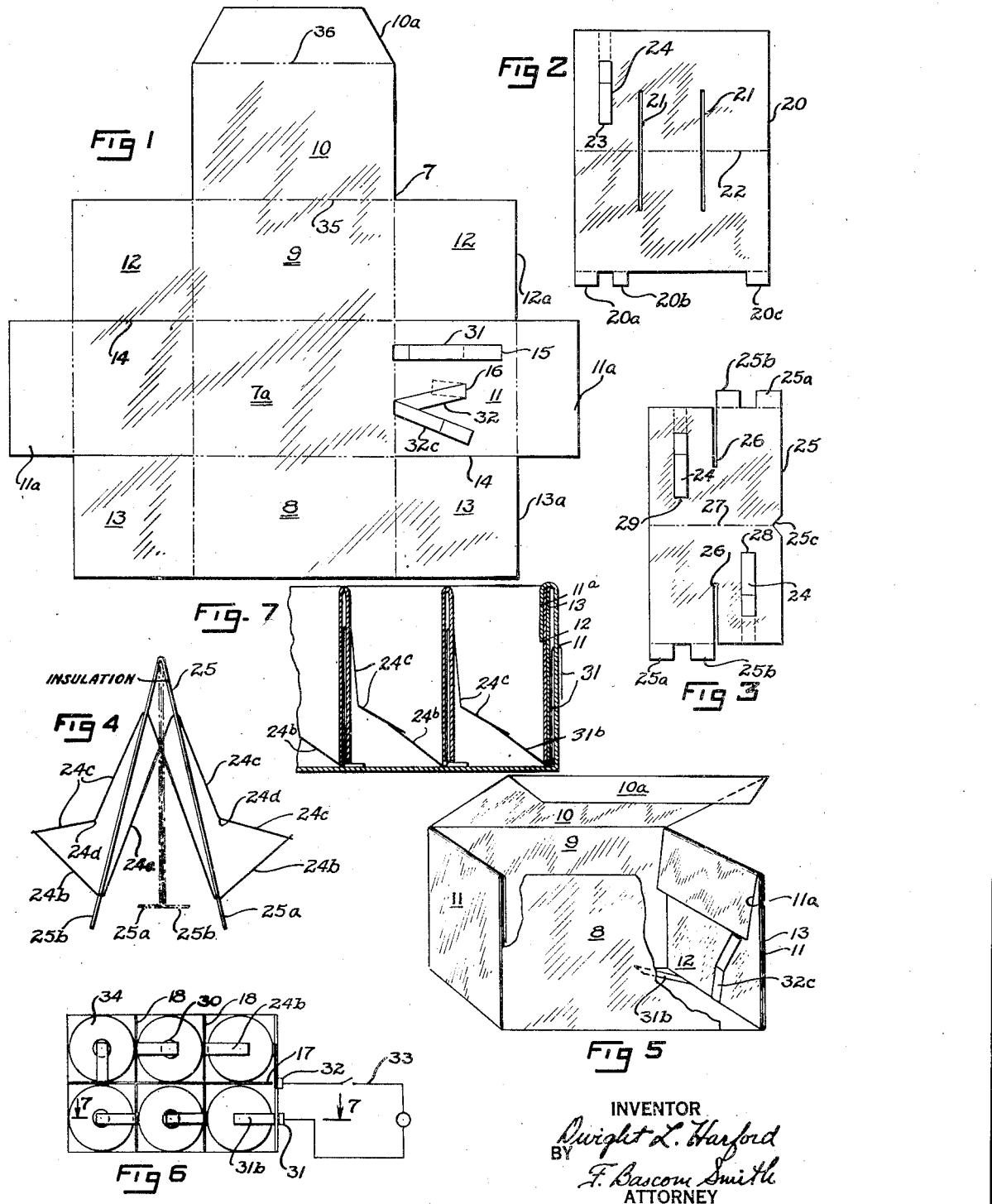
INVENTOR
Dwight L. Harford
BY F. Bascom Smith
ATTORNEY Patented July 30, 1946

2,405,034

UNITED STATES PATENT OFFICE 2,405,034

BATTERY

Dwight L. Harford, Los Angeles, Calif., assignor to A. Parley Johnson, Downey, Calif.

Application August 12, 1942, Serial No. 454,493

6 Claims. (Cl. 136—173)

This invention relates to a battery box and more particularly to a container for dry cells of the type usually employed in flash lights.

One of the objects of the present invention is to provide a novel battery box for dry cells which is so constructed and arranged that different voltages may be obtained from the battery by changing the positions of the cells in the box.

Another object is to provide a dry cell container having novel current carrying means adapted to yieldably engage the positive and negative electrodes of each cell, the latter being freely disengaged from said means, whereby the position of any cell may be readily changed to vary the voltage output of the battery.

Another object is to provide a novel and inexpensive container for dry cells which is formed of cardboard blanks.

A further object is to provide a partitioned container for dry cells which is so constructed and arranged that each cell is retained in a separate compartment with conducting members extending through a plurality of walls of each compartment.

The above and other objects and advantages of the invention will appear more fully hereafter in the detailed description of the invention, which is to be read in connection with the accompanying drawing, wherein like reference characters refer to like parts throughout the several views. It is to be expressly understood, however, that the drawing is for the purpose of illustration only and is not designed with a view to defining the limits of the invention, reference being primarily had for this purpose to the appended claims. In the drawing, Fig. 1 is a plan view of a blank of flexible material, such as cardboard, which is preferably used in making the walls of the container;

Fig. 2 is a top plan view of a flexible, fibrous blank which is employed in forming a longitudinal partition for the container;

Fig. 3 is a plan view of a fibrous blank employed in making one or more transverse partitions;

Fig. 4 is an end view illustrating the disposition of conducting members in one of the transverse partitions;

Fig. 5 is a side elevation of the blank of Fig. 1 folded into a container and with the cover of the container open;

Fig. 6 is a bottom plan view illustrating a six unit battery with four of the batteries in series and two of the batteries disconnected; and Fig. 7 is a sectional view with parts broken away of the battery box of Fig. 6 with the cells removed, the section being taken substantially along line 7—7 of Fig. 6.

A flexible blank 7 (Fig. 1) which is preferably formed of cardboard covered with a waterproofing paint, is used to form the walls of the box or container. As shown, this blank has a bottom 7a from which extend side walls 8 and 9 and a cover 10 provided with a trapezoidal tongue or tab 10a. Extending from the opposite ends of the bottom and side walls are rectangular tabs 11, 12 and 13. Tabs 12 and 13 are square while tab 11 is elongated to provide a tab 11a. To form the box, tabs 12 and 13, which are separated from tabs 11 by means of cuts 14, are folded towards each other, along the dot-dash lines, through 90°, and side wall tabs 8 and 9 are folded towards each other through 90°. Each tab 12 now overlies the adjacent tab 13. Tabs 11 are now folded through 90° and the tabs 11a folded through 180° so that they overlie the edges 12a and 13a, respectively, of the square end tabs. A container is now formed with the cover open. It will be noted that the right tab 11 is provided with two slits 15 and 16 for a purpose to be described hereafter.

Into the container thus formed there are inserted longitudinal and transverse partitions 17 and 18 adapted to form compartments for the dry cells. The longitudinal partition is formed from a blank 20 (Fig. 2) which is substantially rectangular but which is preferably provided with small tabs 20a, 20b and 20c at one end thereof. Blank 20 has cut therefrom one or more slots 21, the number of slots formed depending on the number of compartments. For example, if six compartments are desired two slots are used, the slots being parallel and centrally disposed with regard to a central folding line 22. The distance between the slots and the adjacent parallel edges of the blank are substantially equal. The blank is provided with a slit 23 through which passes a conducting strip 24, to be described more fully hereafter. An adhesive, such as paste or glue, is preferably placed on the inner face of blank 20 so that when the same is folded along line 22 is forms a flat wall of two thicknesses adapted to be inserted longitudinally and centrally within the box. Adhesive may also be applied to the tabs 20a, 20b and 20c which are folded over at right angles and engage the bottom of the box whereby the longitudinal partition or wall is retained in the desired position.

Each transverse partition is formed from a fiber blank 25 (Fig. 3). If six compartments are desired in the completed container then two such partition blanks are used. As shown, the blank is rectangular and is provided with two slots 26, each of which extends inwardly from the edges of the narrow sides of the blank so that when the blank is folded along line 27 the slots overlie each other to form a single slot. A suitable adhesive is employed on the inner faces of the blank so that when the same is folded it forms a fairly rigid, two-ply partition. Tabs 25a and 25b are provided on the opposite edges of the blank between the adjacent slot and the corner of the blank, whereby the partition may be adhesively secured in position in the container, if desired. The blank is also provided with slits 28 and 29, and a V-shaped notch 25c. The latter is provided to facilitate the insertion of tab 10a between the inner face of side wall 8 and the adjacent edges of partitions 18 when the container cover 10 is closed.

Novel means are provided for operatively connecting each cell to the next adjacent cell in series, said means being so formed as to insure a good contact with the positive electrode of the cell and with the side wall of the case of the cell, which case acts as the negative electrode. Preferably the connecting means, which constitute the circuit between the adjacent cells, are formed from flat, resilient strips of a good conducting metal, such as copper, each strip passing through a slit in a partition and being adapted to contact two adjacent cells. These strips or conductors are similar to member 24, referred to above, and as shown more clearly in Fig. 4, comprise a central straight portion 24a and end portions 24b, 24c. The portion 24b passes under the edge of the blank opposite to the half of the blank having the slit cut therein, and said portion, in the form shown, is bent relative to portion 24a through an angle greater than 90° so that the free end thereof is normally located a substantial distance above the bottom wall of the compartment and approximately at the center thereof relative to the side walls (Fig. 7). When a dry cell in an inverted position is placed in a compartment, portion 24b yields and is held in engagement with the bottom of the box, and also in engagement with the center or positive electrode 30 of the cell (Fig. 6). Intermediate the free end of portion 24c and the bend formed in the strip where portion 24c joins portion 24a, the strip is bent as at 24d so that said end does not lie flat against the partition wall but extends outwardly from the wall to approximately the center of the compartment. Portion 24c is of such length that its free end is sufficiently close to the bottom of the compartment to resiliently engage and make electrical contact with portion 24b within the compartment when a cell has been removed or when no cell is therein (Fig. 7). This arrangement also insures yielding contact with the side wall of the casing, i. e., the negative pole, of the cell when the latter is inserted into the compartment.

Two conducting strips 31 and 32, which are quite similar to strips 24, are provided in an end wall of the container. Strip 31 has a straight central portion connected to a positive electrode portion 31b which corresponds in shape and function to portions 24b, while strip 32 has a portion 32c which functions in a similar manner to portions 24c, when a cell is positioned in the compartment containing portion 32c. The latter portion differs from portion 24c by having the free end thereof bent in the direction of the partition wall instead of away therefrom. Preferably, the third portion of strips 31 and 32 pass through slits 15 and 16 and extend downwardly along the outer face of the end wall of the container to form contacts for connecting the battery to a "use" circuit 33, such as a flashlight bulb circuit, or a circuit such as is shown in my United States Patent No. 2,228,009, dated January 7, 1941. In order that these two contacts may be more closely situated, the end portions may be bent at an angle as shown in Fig. 1. Preferably all of the conducting strips are passed through their respective slits before the blanks are folded and the folded partition blanks are positioned so that the bottom of slots 26 in blanks 25 engage the bottom of slots 21 in the blank 20.

In certain instances it is highly desirable to vary the voltage of the battery. This can be readily done by inserting one or more of the cells 34 upside down within the container. If each cell, assuming a battery of six cells, is inserted into the box with the center electrode down and in contact with portions 24b of the contact strips then a voltage of 9 volts is obtained, for example. With five cells down and one up, 7½ volts are obtained. With four cells down and two up, 6 volts are obtained, etc. All the inverted cells, except the cell in the compartment containing portion 32c, can be removed from the box without affecting the above-described operation because portions 24b and 31b are adapted to engage the end portions of contacts 24c in their respective compartments to complete the circuit when the cells are removed (Fig. 7). As shown in Fig. 6, the right hand cells are so positioned in their compartments that their positive electrodes are adjacent cover 10, and serve no function except that their casings complete the circuit from one strip to the next conducting strip and therefore the lower cell of these two could be removed without affecting the nature of the circuit since portions 31b and 24c will immediately move into yielding contact to complete the circuit. After the cells are inserted in the compartments, tab 10 is folded along line 35 and tab 10a is folded along line 36, the last-named tab being tucked into the side of the box to completely enclose and house the dry cells.

There is thus provided an inexpensive container or box for flashlight cells which can be readily formed and which is strong and light. Different voltages can be quickly obtained from the battery by merely upending one or more of the cells to obtain the selected voltage whereby the lamp in the "use" circuit can be converted from a lantern for ordinary use into a very strong searchlight. The conducting members insure good electrical contact but do not interfere with the removal from or positioning of the cells in the compartments. Various changes may be made in the blanks and in the partition members as well as the size and shape of the tabs, as will now be seen by those skilled in the art. For example, if desired, end contact member 32 may be formed and mounted in a manner similar to contact members 24 so that a complete circuit may be formed when only one cell is placed in the box, irrespective of the compartment selected.

What is claimed is:

1. In a container for dry cells, one or more double-walled partitions of insulating material in said container, and conducting members carried by said partitions for connecting said cells in series, each of said conducting members having a vertical central portion disposed between the walls of a partition, a portion integral with the upper end of said central portion and extending downwardly therefrom exteriorly of one of said walls through an opening spaced from the upper end of said wall, and a portion integral with the lower end of said central portion and extending laterally therefrom beneath the lower end of the other of said walls, said second named portion and said last named portion adapted to engage the side wall of the casing and the positive electrode, respectively, of two adjacent cells.

2. A dry cell battery comprising a container formed of insulating material and having multiple ply end walls, double-walled partitions of insulating material dividing said container into a plurality of parallel rows of compartments, a dry cell in each compartment, conducting members carried by said partitions for connecting said cells in series, each of said conducting members having a vertical central portion disposed between the walls of a partition, a portion integral with the upper end of said central portion and extending downwardly therefrom exteriorly of one of said walls through an opening spaced from the upper end of said wall, and a portion integral with the lower end of said central portion and extending laterally therefrom beneath the lower end of the other of said walls, said second named portion and said last named portion adapted to engage the side wall of the casing and the positive electrode, respectively, of two cells in adjacent compartments, and two conducting members carried by one of said end walls for connecting said cells to a use circuit, each of said last named conducting members having a vertical portion disposed between the plies of said end wall and other portions disposed within the adjacent end compartments and exteriorly of said end wall, respectively.

3. In a battery of the class described, a single folded fibre blank forming the bottom, sides and end walls of a container, transverse and longitudinal one-piece folded fibre partitions in said container forming double-walled compartments therein, a dry cell in each compartment, and a plurality of flat conducting strips carried by said partitions for connecting said cells in series, each of said strips having a vertical central portion disposed between the walls of a partition, a portion integral with the upper end of said central portion and extending downwardly therefrom exteriorly of one of said walls through an opening spaced from the upper end of said wall, and a portion integral with the lower end of said central portion and extending laterally and upwardly therefrom beneath the lower end of the other of said walls, said second named portion and said last named portion adapted to engage the side wall of the casing and the positive electrode, respectively, of the cells in adjacent compartments.

4. In a battery of the class described, a single folded blank of insulating material forming the bottom, sides and multiple ply end walls of a container, one-piece folded partitions of insulating material for dividing said container into double-walled compartments, a dry cell in each compartment, resilient conducting members carried by said partitions for connecting said cells in series, each of said conducting members having a vertical portion disposed between the walls of a partition, a portion integral with the upper end of said central portion and extending downwardly therefrom exteriorly of one of said walls through an opening spaced from the upper end of said wall, and a portion integral with the lower end of said central portion and extending laterally and upwardly therefrom beneath the lower end of the other of said walls, said second named portion and said last named portion adapted to engage the side wall of the casing and the positive electrode, respectively, of the cells in adjacent compartments, and two transversely spaced resilient conducting members carried by one of said end walls for connecting the cells in adjacent end compartments to a use circuit, each of said last named conducting members having a vertical portion disposed between the plies of said end wall.

5. In a dry cell battery of the type having insulated compartments for each cell with at least two walls of each compartment formed of two thicknesses of insulating material, a contact strip for connecting a cell in one compartment with a cell in the next adjacent compartment, comprising a central straight portion disposed between the two thicknesses of material and insulated thereby, a resilient portion integral with the upper end of said central portion and extending downwardly therefrom exteriorly of the wall to engage the side of a cell in a compartment, and a laterally and upwardly extending resilient portion integral with the opposite end of the central portion and projecting beneath said wall to engage the positive electrode of an inverted cell in the next adjacent compartment.

6. In a battery of the class described, a box formed of insulating material and having double-walled partitions of insulating material forming a plurality of compartments open at the tops thereof for endwise insertion of dry cells therein, a resilient contact member carried by one of said partitions for connecting a dry cell in one compartment in series with a dry cell in the adjacent compartment, said contact member having a vertical central portion disposed between the walls of said partition, a portion integral with the lower end of said central portion and extending laterally and upwardly therefrom beneath said partition into one compartment to engage the end of the casing or the positive electrode of a dry cell in said compartment, and a portion integral with the upper end of said central portion and extending through said partition downwardly and laterally into the adjacent compartment to engage the side wall of the casing of the dry cell in said adjacent compartment, and a second resilient contact member having laterally and upwardly and downwardly and laterally extending portions disposed in said adjacent compartment and in the next adjacent compartment respectively, the laterally and upwardly extending portion of said second named member being adapted to electrically contact the downwardly and laterally extending portion of said first named member when no cell is contained in said adjacent compartment.

DWIGHT L. HARFORD.